United States Patent [19]

Doniwa

[11] 4,273,198
[45] Jun. 16, 1981

[54] MOTOR-DRIVEN CLAMPING METHOD AND DEVICE

[75] Inventor: Tabito Doniwa, Atsugi, Japan

[73] Assignee: Daiichi Dentsu Kabushiki Kaisha, Tokyo, Japan

[21] Appl. No.: 55,608

[22] Filed: Jul. 9, 1979

[51] Int. Cl.³ .................. B25B 23/147; B25B 21/02
[52] U.S. Cl. .................................. 173/1; 173/12
[58] Field of Search ............... 173/1, 12; 73/761, 139

[56] References Cited

U.S. PATENT DOCUMENTS

| | | | |
|---|---|---|---|
| 3,920,088 | 11/1975 | Dudek | 173/12 X |
| 3,926,264 | 12/1975 | Bardwell et al. | 173/12 |
| 4,163,310 | 8/1979 | Sigmund | 73/761 X |

*Primary Examiner*—Peter P. Nerbun

*Attorney, Agent, or Firm*—Robert E. Burns; Emmanuel J. Lobato; Bruce L. Adams

[57] ABSTRACT

A motor-driven clamping method characterized by a two-step control operation, in which when a torque applied to a member to be clamped reaches a first set value smaller than a reference set value, a drive motor is once decelerated and rapidly stopped; then the drive motor is re-started immediately and controlled so that the torque applied to the member to be clamped increases along a predetermined torque increasing characteristic; and when the torque applied to the member to be clamped reaches a second set value corresponding to the reference set value, the drive motor is braked to be rapidly stopped. A handy motor-driven clamping device of light weight can be prepared by embodying the above method.

2 Claims, 10 Drawing Figures

MOTOR-DRIVEN CLAMPING METHOD AND DEVICE

BACKGROUND OF THE INVENTION

1. Field of the Invention

This invention relates to a motor-driven clamping method for driving a bolt or the like with a constant torque.

2. Description of the Prior Art

For example, in the assembling of an automobile or an internal combustion engine, an operation of driving a bolt into a workpiece and clamping it for rigidity is carried out at an extraordinary frequency and is very laborious; hence, it is achieved in many cases by an automatic clamping tool utilizing compressed air or electric power. A motor-driven tool, though usually heavy as compared with a pneumatic tool, is easy to handle and less noisy, and hence is widely employed. With a prior art motor-driven tool, the head of a bolt is inserted in a socket of a rotary shaft affixed to the tip of the tool and the bolt is rapidly driven into a workpiece by the rotary shaft (driven via a reduction gear, for example, at 500 rpm) with the rotation (for instance, 5000 rpm) of a motor. When the driving operation is almost complete and a load on the motor starts to increase suddenly, a mechanical clutch between the motor and the rotary shaft is disengaged to switch the rotary shaft to a low speed (for example, 5 rpm) and, when it is detected by a torque detector built in the tool that the torque applied to the rotary shaft has reached a certain value, the motor is stopped; in this manner, the bolt is clamped to the workpiece with a constant torque. As a consequence, the clamping torque can be made uniform but the weights of the built-in clutch, the device for mechanically detecting the torque to disengage the clutch and so forth are added to the weight of the motor, so that the total becomes heavy and inconvenient to handle.

SUMMARY OF THE INVENTION

An object of this invention is to provide a motor-driven clamping method and device overcoming the above defects of the prior art.

A motor-driven clamping method of this invention is characterized by a two-step control operation. When a torque applied to a member to be clamped reaches a first set value smaller than a reference set value, a drive motor is once decelerated and rapidly stopped. The drive motor is then re-started immediately and controlled so that the torque applied to the member to be clamped increases along a predetermined torque increasing characteristic. Thereafter, when the torque applied to the member to be clamped reached a second set value corresponding to the reference value, the drive motor is braked to be rapidly stopped.

A handy motor-driven clamping device of light weight can be prepared in accordance with the above method of this invention.

BRIEF DESCRIPTION OF THE DRAWING

This invention will be hereinafter described in details with reference to the accompanying drawing, in which.

DESCRIPTION OF THE PREFERRED EMBODIMENTS

Figure 1A:
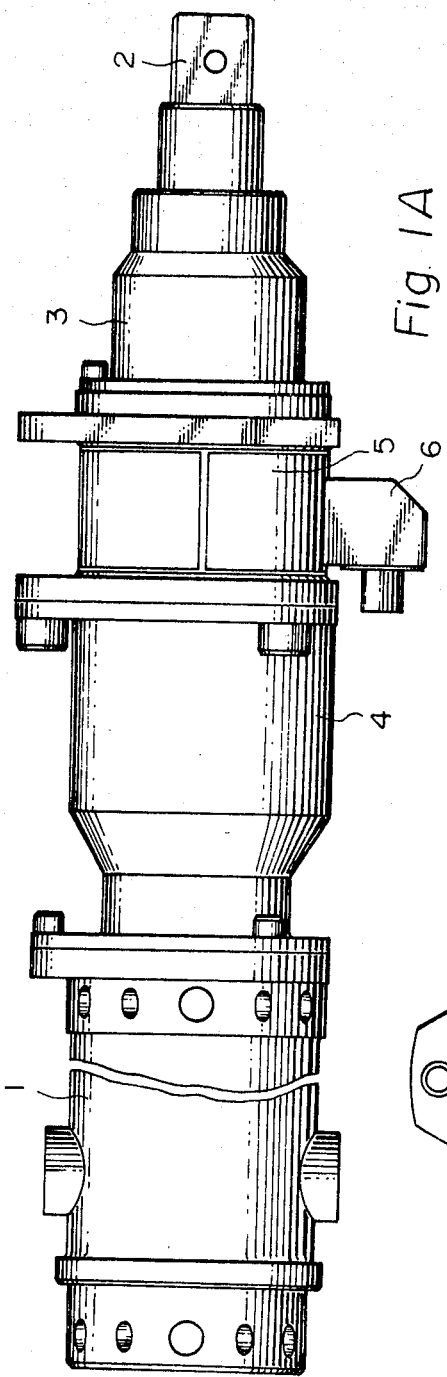
FIGS. 1A and 1B show an external appearance of a tool part of a device embodying this invention and a front view of its rotary shaft.
Figure 1B:
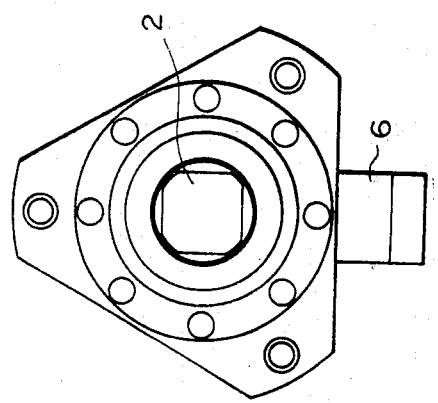

With reference to FIGS. 1A and 1B, reference numeral 1 indicates a drive motor (having an input of 0.9 to several kVA, for example); and 2 designates the top end portion of the rotary shaft, which has a square configuration and is formed to receive and fixedly support a socket for engagement with a bolt. This top end portion is adapted to move into and out of a case 3 within a certain range of stroke. Reference numeral 4 identifies a reduction gear portion and 5 denotes a torque detecting portion for detecting the torque applied to a rotary shaft in it. In FIGS. 1A and 1B, only one clamping tool is shown but, in practice, a plurality of (for example, twenty) such tools are arranged in parallel and their operations and settings and control of the clamping torque are effected by a control panel (not shown) provided separately of the tools. Reference numeral 6 represents a connector of connecting lines for connecting the torque detector and the motor 1 to the control panel. The construction of the tool will be described in details with reference to FIG. 8.

Next, the basic operation of this invention will be described. As mentioned above, the tool shown in FIGS. 1A and 1B does not employ a clutch used in the prior art; therefore, a movable part between the motor and the rotary shaft is only reduction gears. This arrangement is very advantageous in that the tool is made small-sized, lightweight, more durable and simple in maintenance but, on the other hand, various circuits are required, since control by the clutch is replaced by speed control of the drive motor by electrical circuits.

Figure 2:
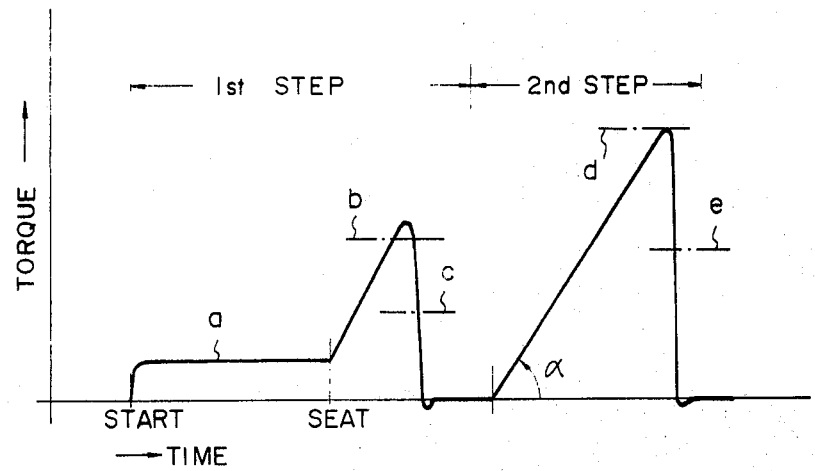
FIG. 2 is a timing chart of a torque during the use of the tool shown in FIGS. 1A and 1B.

FIG. 2 is a timing chart of a torque when the tool shown in FIG. 1A is in use. A bolt is driven and tightened by a two-step operation. The torque applied to the rotary shaft of the tool is set to five values, b to e and a, d being a reference torque value for completion of tightening the bolt. In practice, the bolt to be tightened is slightly screwed in a tap hole (or a nut) of a workpiece in advance and the bolt is tightened by a first-step operation to an intermediate torque value and then further tightened by a second-step up to a predetermined value.

The five torque values shown in FIG. 2 are set by a potentiometer of the control panel and the motor 1 is started. At this time, the rotary shaft has no load thereon and is driven at a high speed (for example, of 300 rpm) and its torque has the small value a, but when the bolt is seated on the clamped bed, the rotation speed of the rotary shaft decreases but its torque increases abruptly. This torque is detected by the torque detector 5 and when the torque reaches the first-step torque set value b, a reverse current is applied to the drive motor 1 to stop its rotation rapidly. This reverse current is cut off when the torque detector output reaches a first-step brake set value c. When the drive motor 1 is thus put into a completely or substantially standstill state, the second-step operation is immediately started. In a case of a plurality of such tools being used, however, the second-step operation is started after making sure that the rotary shafts of all the tools have finished the first-step operation, and in a case of only one tool being used, the first-step operation is immediately followed by the second-step operation. In the second-step, the rotation speed and output of the motor are controlled by feeding back thereto the torque detected output so that the torque of the rotary shaft increases to reach the reference clamping torque d along an inclined characteristic curve of a present torque increasing angle $\alpha$. Upon detection of the torque value reaching d, a reverse current is applied to the drive motor 1 to stop it rapidly. This reverse current is cut off when the torque reaches the second-step brake set value e.

The arrangements of the torque detector, a circuit for selectively switching currents on the basis of a comparison between the detector output and the torque set values, a sequential circuit and so forth, will be hereinafter described except known circuits.

Next, a description will be made of the construction and operation of a circuit for achieving the abovesaid torque control. Before entering into such a description, reference is made to advantages of the two-step control described above. (1) The two-step control of the torque value prevents damage to the tool by seating of the bolt and ensures to prevent application of an excessive torque to the bolt even when the torque of the rotary shaft increases abruptly after seating of the bolt. (2) The cutting off of the reverse current is accomplished in dependence on the amount of feedback of the torque detected value, ensuring smooth disengagement of the socket 2 from the bolt to prevent excessive reverse-current braking from loosening the bolt after being tightened. (3) In the second step, the torque increasing rate on the time axis is controlled with the amount of feedback of the torque value itself; this ensures to provide constant clamping conditions at all times. (4) Since the torque value can easily be switched from the final clamping speed (proportional to $\alpha$) or a high-speed to a low-speed operation, optimum clamping is possible according to use. According to an experiment conducted on the tool of FIG. 1A, in the case of $\alpha = 45°$ the time required for tightening a bolt was about 2.5 sec. after seating of the bolt and, in this case, the number of rotations of the rotary shaft was 10 before seating of the bolt.

Figure 3:
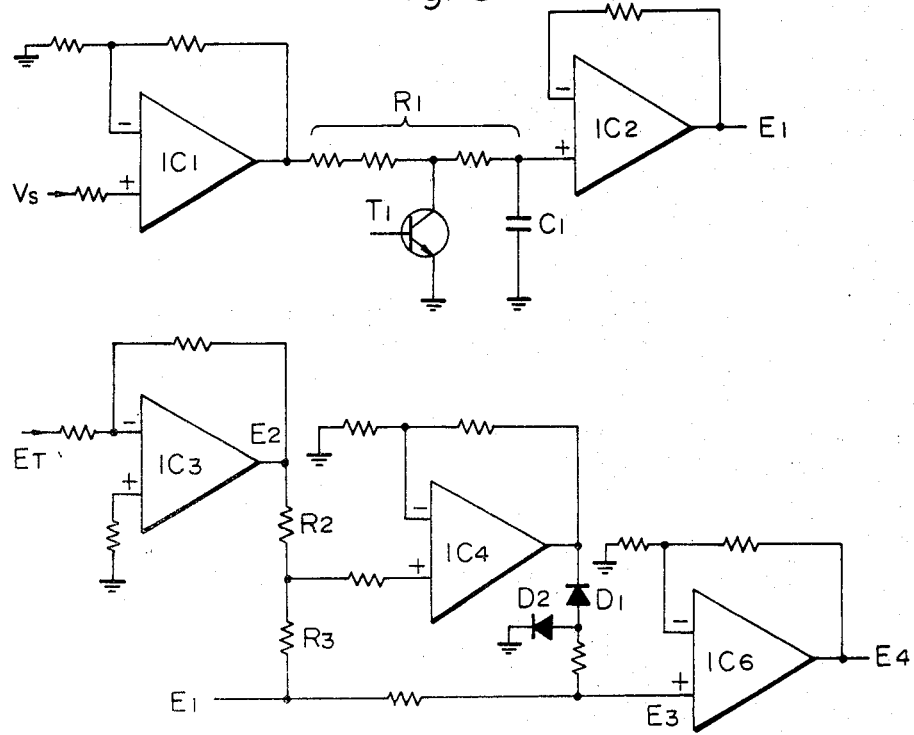
FIGS. 3 and 5 are circuit diagrams illustrating examples of the circuit construction of a control part of the device embodying this invention.
Figure 4:
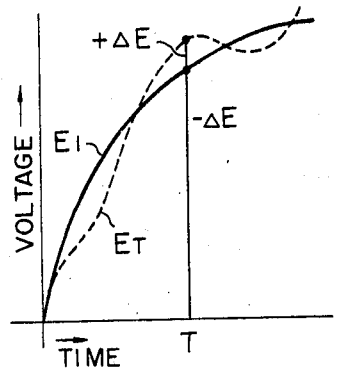
FIG. 4 is a motor torque variation characteristic diagram.
Figure 5:
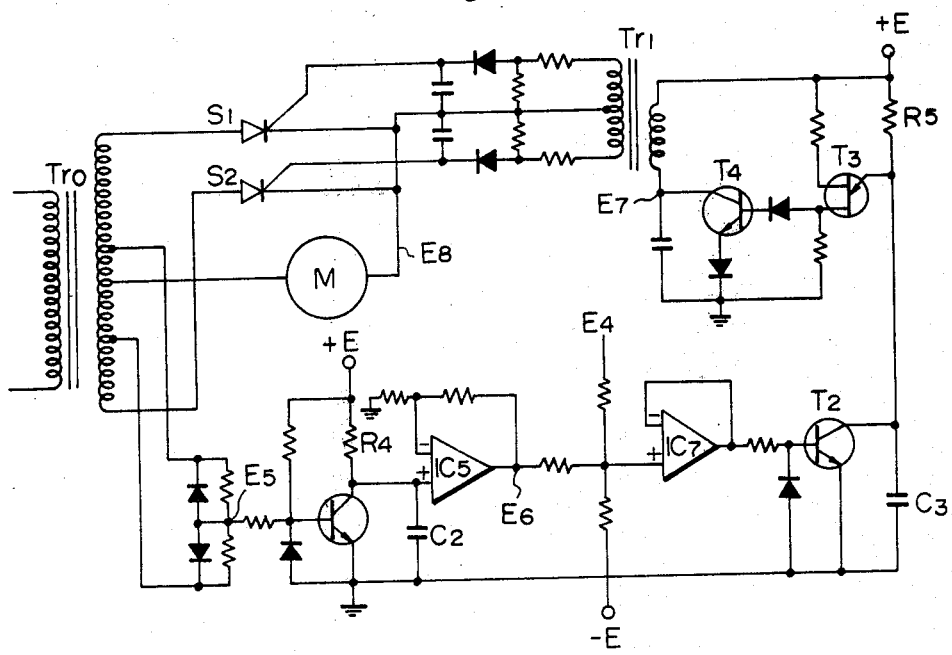

FIGS. 3 to 5 are diagrams showing the circuit construction of the principal part of a motor output control panel using the torque detector output and explanatory of its operation. In FIGS. 3 to 5, each reference character IC indicates an operational amplifier. FIG. 3 illustrates a setting circuit for providing the torque characteristic in the second step with a gradient of $\alpha$. In FIG. 3, a set voltage Vs for the reference torque d is applied to the input of an operational amplifier $IC_1$. If a transistor $T_1$ is arranged so that it is switched from the ON state to the OFF state when the bolt is seated and the second step operation is started (This arrangement can easily be achieved by comparing the output voltage of the detector for detecting the torque applied to the rotary shaft of the tool with a voltage corresponding to a set torque, for example, by means of a comparator or the like to detect that the both voltages are equal to each other.), when the transistor $T_1$ is in the OFF state, a capacitor $C_1$ is charged in accordance with time constants of $R_1$ and $C_1$ and the charged voltage is amplified by an operational amplifier $IC_2$, whose output $E_1$ varies as indicated by $E_1$ in FIG. 4. This characteristic is to provide the torque characteristic of the gradient $\alpha$ in the second-step operation. A torque value $E_T$ by the detector is inverted by an operational amplifier $IC_3$ in polarity, and its output $E_2$ and the output $E_1$ from the operational amplifier $IC_2$ are respectively subtracted by resistors $R_2$ and $R_3$ and amplified by an operational amplifier $IC_4$. If the output from the operational amplifier $IC_4$ is positive (if $E_1 > E_T$), an input voltage $E_3$ to an operational amplifier $IC_6$ of the next stage is prevented by diodes $D_1$ and $D_2$ from being affected by the output from the operational amplifier $IC_4$ but, if the output from the operational amplifier $IC_4$ is negative (if $E_1 > E_T$), the input voltage $E_3$ drops in proportion to the magnitude of this output. In other words, as shown in FIG. 4, when the output $E_T$ exceeds the value of the output $E_1$, the input voltage $E_3$ is lowered by $-\Delta E$, with the result that the output $E_T$ is made to approach the output $E_1$. The reason for this is that an output voltage $E_4$ from the amplifier $IC_6$, in which the output $E_3$ is amplified, controls the output (torque) of the motor 1 in the following manner.

Figure 6:
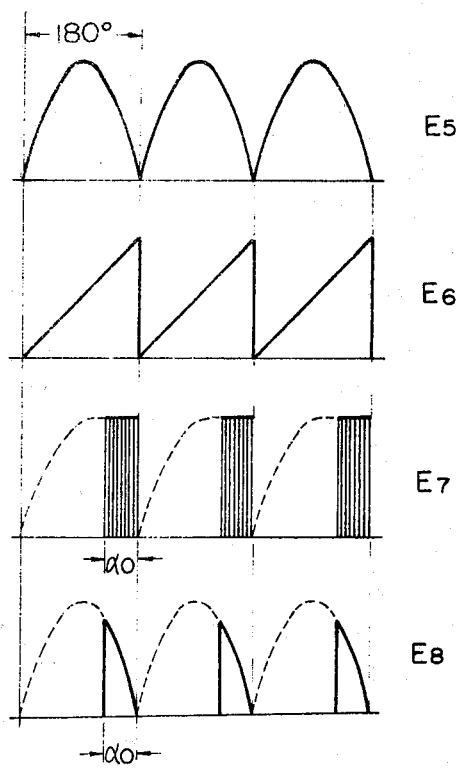
FIG. 6 shows waveforms at respective parts of the circuit in FIG. 5.

FIG. 5 shows an example of the construction of a circuit for controlling the motor speed with the control voltage $E_4$, and FIG. 6 shows waveforms appearing in various parts of the circuit. In FIG. 5, reference character $T_{r0}$ indicates a commercial power source transformer and one portion of the output from its secondary winding is full-wave rectified to produce a voltage $E_5$ for synchronization use. The waveform of the voltage $E_5$ is depicted in FIG. 6. From this voltage $E_5$, an output voltage $E_6$ from an operational amplifier $IC_5$ is transformed into such a sawtooth wave as shown in FIG. 6 in accordance with a time constant by a resistor $R_4$ and a capacitor $C_2$. A voltage obtained by adding the abovesaid voltage $E_4$ to the voltage $E_6$ is applied via a voltage-follower operational amplifier $IC_7$ and a transistor $T_2$ to an oscillator made up of a unijunction transistor $T_3$ and a transistor $T_4$ and is used as a trigger voltage synchronized with the power source of the oscillator. Its output voltage $E_7$ becomes an oscillation voltage which occurs only during a phase angle $\alpha_0$, as depicted in FIG. 6. It is evident that the phase angle $\alpha_0$ is proportional to the voltage $E_4$. The output voltage $E_7$ is provided to a transformer $T_{r1}$ and the resulting rectified voltages are applied to trigger electrodes of thyristors $S_1$ and $S_2$, so that the waveform of a voltage $E_8$ supplied to a motor M of the tool from each thyristor becomes a waveform of the same phase as the voltage $E_4$ and the output from the motor M increases in proportion to $\alpha_0$. Since the voltage $E_4$ is proportional to the voltage $E_1$, it may also be considered that $\alpha_0$ is proportional to $\alpha_0$ and that $\alpha_0 = \alpha$.

In short, the operations of the circuits of FIGS. 3 and 5 are to produce first an ideal waveform $E_1$ close to the secondstep torque increasing characteristic in FIG. 2 and to control the motor M in such a manner that the torque value increase along the characteristic $E_1$. This can be achieved as described above. If full-wave rectification takes place when $\alpha_0$ is 180°, it is necessary that the motor M can yield an output larger than the set torque value d. After seating of the bolt, the torque usually reaches the set value with the small angle $\alpha_0$; therefore, if the $E_1$ increasing characteristic (FIG. 4) is assumed such that the set value of the reference clamping torque d is close to the upper limit of the charging characteristic of the $R_1C_1$ time constant circuit, there is obtained a reference curve in which the torque increasing rate is reduced as the set value is approached. If a torque exceeding the reference curve occurs, it is equivalent to a negative feedback of the torque detected value $E_T$ itself, making the torque increasing characteristic approach to the $E_1$ characteristic, as set forth previously.

Figure 7:
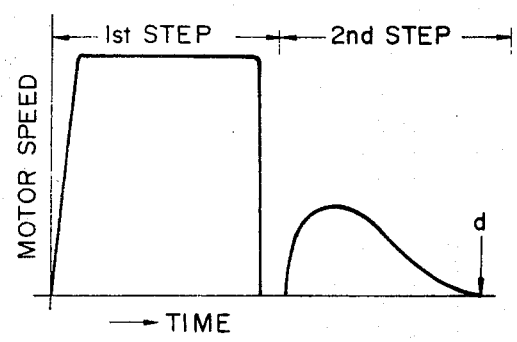
FIG. 7 is a characteristic diagram showing the torque shown in FIG. 4 in terms of the motor speed.

As described above, in the present invention all control operations are accomplished by the feedback of torque values but, as a result, the number of rotation (speed) of the motor 1 of the motor-driven tool is controlled. FIG. 7 is a motor speed characteristic redescribed from the torque characteristic shown in FIG. 2. When the torque becomes close to the set value d in the second step, the number of rotations of the motor 1 is made very small; therefore, the motor 1 can be accurately stopped at the reference torque value d.

Figure 8:
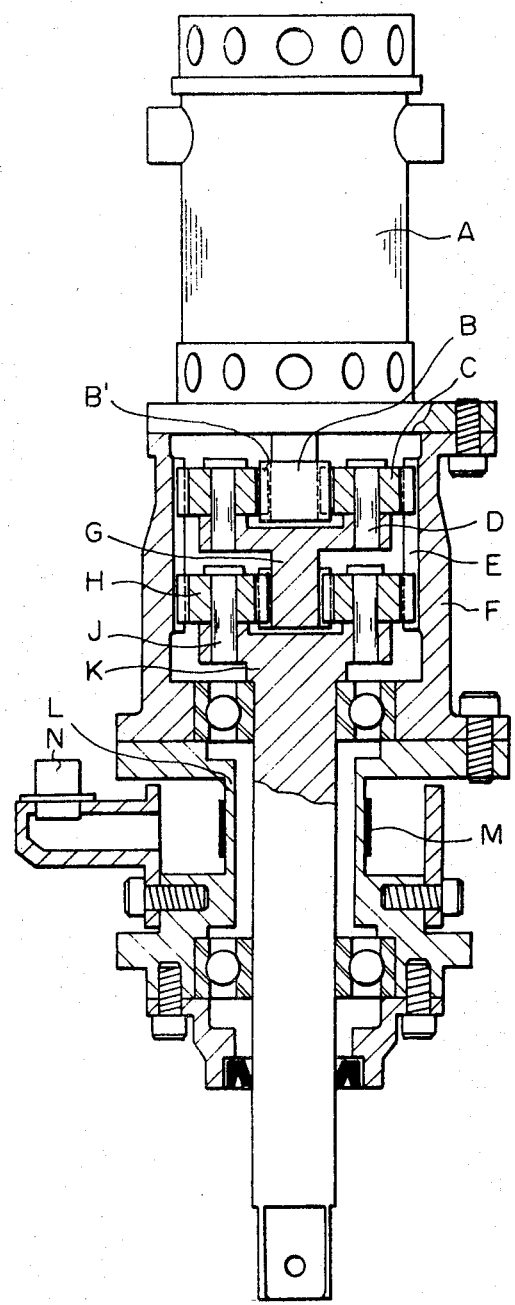
FIG. 8 is an elevation including a longitudinal section of the tool part.

With reference to FIG. 8, the tool structure of an embodiment of this invention comprises a DC motor A, a shaft B of the DC motor A having a gear B' at the top portion, and a planetary gear C engaged with the gear B' of the shaft B and an internal gear E formed on the inner wall of a case F. The revolution of the planetary gear C is transferred to a pinion gear G through a pin D. The rotation of the pinion gear G is transferred to planetary gears H, which act revolutions by the internal gear E. The revolutions of the planetary gears H are transferred through pins J to a drive shaft K for driving a bolt and nut. As mentioned above, the high speed rotation of the DC motor A is reduced to an optimum low speed rotation through the gears B', C, E, H, etc. to be suitable for driving the bolt and the nut.

On a torque transducer L, a strain gauge M is fixed by an adhesive. When the drive shaft K drives the bolt or the nut, the fastening torque raises so that a reaction of the fastening torque is applied to the drive shaft K. The reaction applied to the drive shaft is transferred to the entire part of the tool through the internal gear E to give a torsional moment to the torque transducer L, so that a stress caused by the torsional moment varies the resistance value of the strain gauge M.

Figure 9:
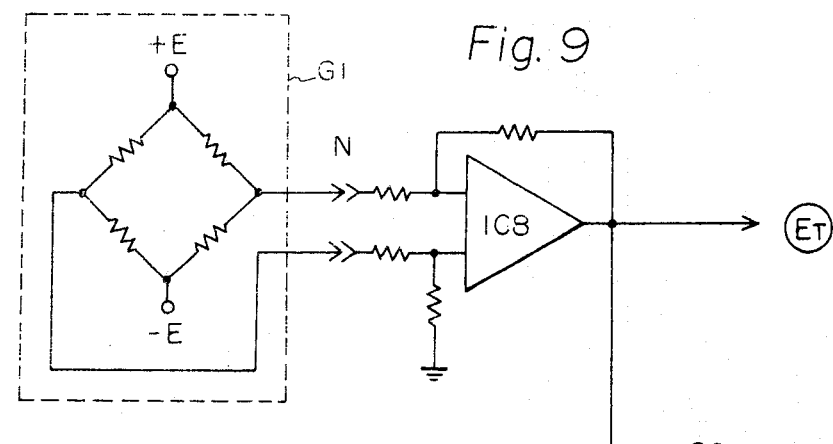
FIG. 9 is a circuit diagram illustrating an example of a detailed control part of the device embodying this invention.
Figure 9:
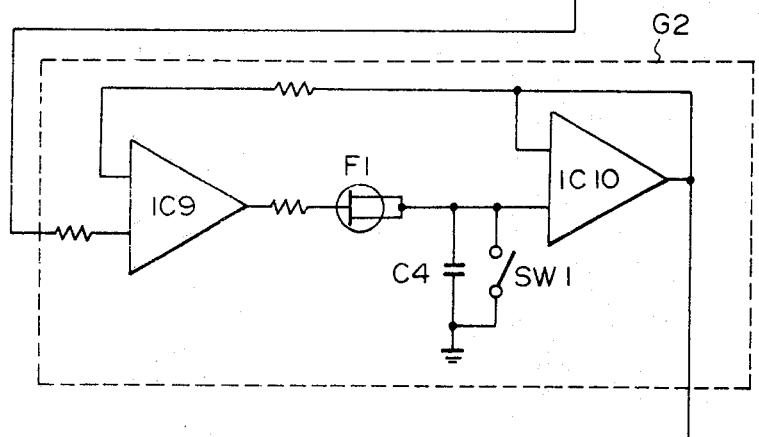
Figure 9:
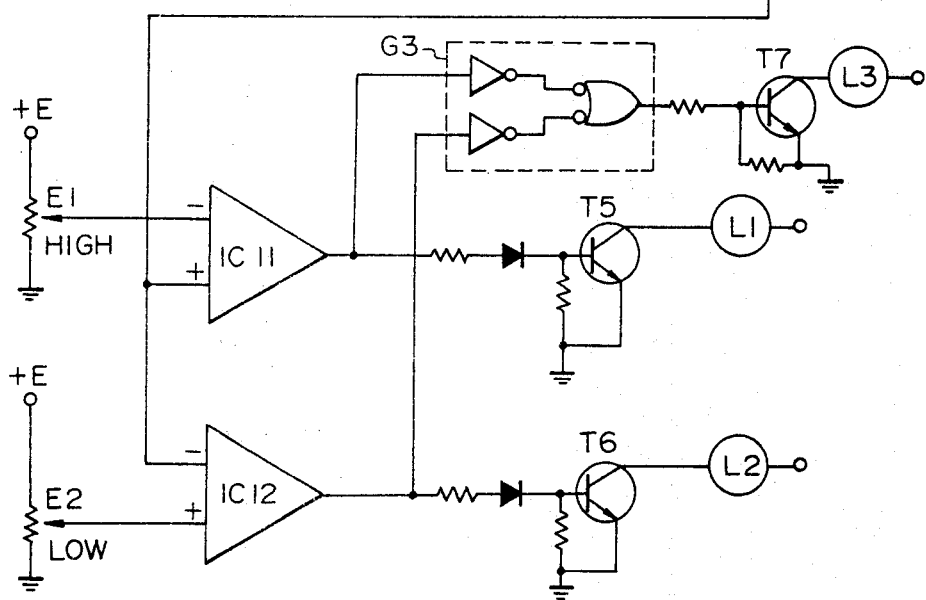

The strain gauge M forms a bridge circuit $G_1$ shown in FIG. 9, the output of which is amplified, through a connector N, by an operational amplifier $IC_8$ to obtain a common input voltage $E_T$ of a gate $G_2$ and of the operational amplifier $IC_3$. The gate $G_2$ forms an analog memory circuit, in which the peak output signal of a torque transducer charged in a capacitor $C_4$ is held at a stable value for a long time period by the use of a FET transistor $F_1$ of high impedance and an operational amplifier $IC_{10}$.

A potentiometer $E_1$ is employed to establish a voltage corresponding to an upper limit of the fastening torque, while a potentiometer $E_2$ is employed to establish a voltage corresponding to a lower limit of the fastening torque.

The stored signal from the gate $G_2$ is compared with these established voltages by comparators $IC_{11}$ and $IC_{12}$, so that lamps $L_1$ and $L_2$ are lightened by transistors $T_5$ and $T_6$ in accordance with the compared results.

Moreover, since the IN limit of the fastening torque is detected by a gate $G_3$ so that a lamp $L_3$ of IN limit is lightened by a transistor $T_7$.

The principle of this invention resides in continuously comparing the fastening torque with respective reference values and in controlling the rotation speed of a DC motor to raise the fastening accuracy. Accordingly, it can be considered from the above principle of this invention that decision circuits for the upper or lower limits and the indication lamps may be unnecessary. However, these monitoring means are provided to detect rare falts or erroneous operations of constructive elements in the above embodiment of this invention.

As has been described in detail in the foregoing, since the present invention eliminates the use of a mechanical clutch which has posed problems in the art, the drive unit becomes small and lightweight and, further, the advantages of the two-step control can be obtained. On top of that, as the low-speed rotation of the motor after seating of a bolt can be electrically adjusted at will, the bolt can be tightened in a short time comparable to that obtainable with a pneumatic tool. Moreover, reversible rotation of the motor is also possible. Accordingly, this invention is of particular utility when employed in a case of using a large number of tools in ganged relationship.

What I claim is:

1. A motor-driven clamping method comprising the steps of:

once decelerating and rapidly stopping a drive motor when a torque applied to a member to be clamped reaches a first set value smaller than a reference set value;

re-starting immediately and controlling the drive motor so that the torque applied to the member to be clamped increases along a predetermined torque increasing characteristic; and braking the drive motor to be rapidly stopped when the torque applied to the member to be clamped reaches a second value corresponding to the reference set value.

2. A motor-driven clamping device comprising:

a case;

a drive motor seated in the case;

a drive shaft rotatably held in the case;

a socket fixedly supported to the top end of said drive shaft for engagement with a member to be clamped;

transmission means mechanically transmitting the high speed rotation of said drive motor to said drive shaft as an optimum low speed rotation;

torque transducer means operatively connected to said drive shaft to produce a DC voltage proportional the fastening torque of said drive shaft;

first detection means connected to said torque transducer for receiving said DC voltage to produce a first detection output when a torque applied to said member to be clamped reaches a first set value smaller than a reference set value;

second detection means connected to said torque transducer for receiving said DC voltage to produce a second detection output when the torque applied to the member to be clamped reaches a second value corresponding to said reference set value;

first control means operatively connected to said first detection means and said drive motor for at once decelerating and rapidly stopping said drive motor in response to said first detection output and for re-starting immediately and controlling the drive motor so that the torque applied to the member to be clamped increases along a predetermined torque increasing characteristic; and second control means operatively connected to said second detection means and said drive motor for braking the drive motor to be rapidly stopped in response to said second detection output.

* * * * *